Nov. 28, 1967  J. D. WILSON  3,355,054
STACKABLE-NESTABLE CONTAINER
Filed May 23, 1966  2 Sheets-Sheet 1

INVENTOR:
James D. Wilson
By Keith D. Beecher
ATTORNEY

Nov. 28, 1967  J. D. WILSON  3,355,054
STACKABLE-NESTABLE CONTAINER
Filed May 23, 1966  2 Sheets-Sheet 2
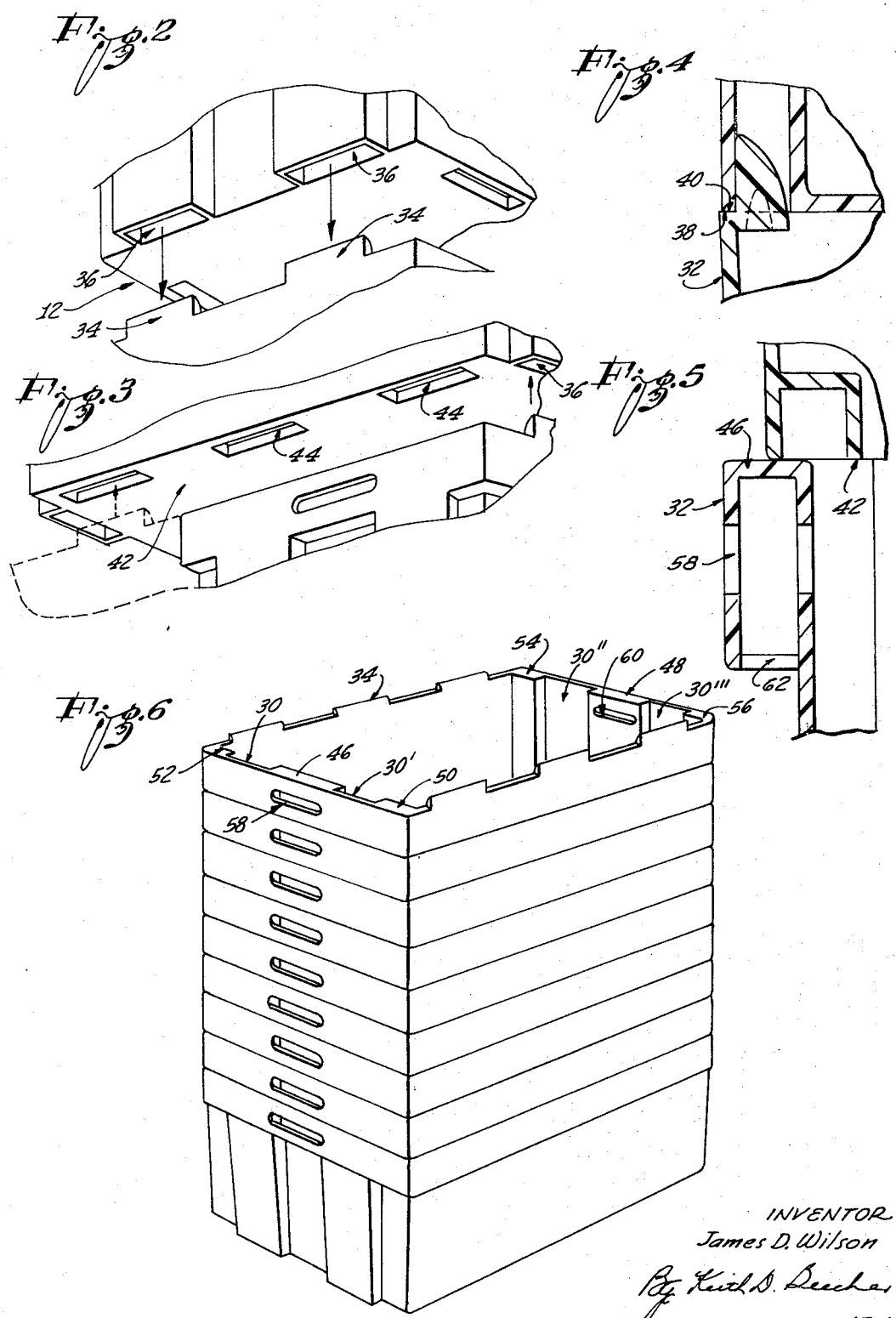
INVENTOR:
James D. Wilson
By Keith D. Beecher
ATTORNEY { # United States Patent Office 3,355,054
Patented Nov. 28, 1967

3,355,054
STACKABLE-NESTABLE CONTAINER
James D. Wilson, Long Beach, Calif., assignor to Banner Metals, Inc., Compton, Calif., a corporation of Ohio
Filed May 23, 1966, Ser. No. 552,046
5 Claims. (Cl. 220—23.6)

ABSTRACT OF THE DISCLOSURE

A stackable-nestable container is described in the specification which has a rectangular configuration and flared walls. The container also has flutes, projecting lugs and recessed portions, these being located and positioned so as to permit the container to be stacked with other like containers, so as to result in a multi-level tier, with each level of the tier containing a plurality of the containers. The containers in each layer of the tier are stacked at 90° with respect to the containers in the next lower layer, and bridge the latter containers, so as to provide a mutual interlock for the containers in the lower layer of the tier.

---

This invention relates to pallet type stackable, nestable lug or tote-box containers for the transportation, storage or display of meats, fruits, vegetables and the like; and which may be formed, for example, of imperforate sheet metal, such as aluminum, or of a molded plastic construction.

The containers of the present invention are intended to be so designed and constructed that they may be conveniently, efficiently and compactly stored upon a pallet having predetermined dimensional limitations. The dimensions of the pallet are restricted by certain transporting, storage and display facilities utilized for the moving, storing and merchandising of the types of products, such as meats, fruits, vegetables and the like, to be placed in the containers of this invention. Because of the space and size considerations imposed on the pallet, the containers to be placed thereon must be carefully and properly designed and constructed so as to compactly fit upon the pallet.

It has been found that the maximum pallet space available may be effectively occupied by the containers where the containers are spaced in a series of three, the three containers being juxtaposed in a side-by-side position where the sides of the containers constitute their longest dimension. Two containers are then placed on the pallet in an end-to-end relationship with their sides normal to the ends of the three containers juxtaposed side-by-side.

The containers are designed and constructed so that the side dimension of one container is equal to one and one-half times the end dimension of each other container. Therefore, when two containers are placed end-to-end, their total side dimension will equal to three times the end dimension of one container. Thus two containers placed in an end-to-end relationship will have a total side dimension equal to the total end dimensions of three containers placed in a side-by-side juxtaposed position.

When the containers are properly positioned on a pallet for handling and the like, the outer peripheral surfaces of the containers form a rectangle, two of the sides of the rectangle each having a dimension equal to three times the end dimension of each container, and the other two sides of the rectangle each having a dimension equal to two and one-half times the end dimension of the containers of this invention. It has been found that these specific dimensional requirements provide a most compact, stable and easy to work with assemblage of containers when they are used for the transportation, storage and display of the produce for which they are most frequently utilized.

In addition to the particular space and dimensional requirements for the containers of this invention, these containers must meet still further and additionally demanding requirements in that these containers must be adaptable for being stored, one upon the top of another, in a manner so that the products and produce residing in these containers are not mashed, bruised, cut, damaged, mutilated or destroyed.

A still further requirement for the containers of this invention is that these containers must be capable of being stacked, nested, stored or assembled one upon the top of another in a vertical arrangement in a manner so that there is a compacting and interlocking of the structure of one container with structure of another container. It is important that the containers have the capability of being stacked, one upon the top of another so as to not only conserve space upon the surface of the pallet, but also so as to provide the maximum number of containers on a pallet and therefore provide the capability of transporting, storing or displaying the maximum amount of produce or products within the containers positioned and assembled upon a single pallet. In stacking the containers of this invention and in placing them upon a single pallet, the assemblage of containers so built up on the pallet must have a steadiness and firmness which will effectively preclude the loss of the produce or products in the containers as well as prevent the loss of the containers themselves in the event a jarring, jolting or other unsteadying force is applied to the pallet and likewise to the structure placed thereon.

An important object of this invention is to provide a container having properly dimensioned proportions so that there is symmetry about the longitudinal and transverse axis of the container and the dimensional aspects of the container are such that the containers may be neatly, compactly and firmly assembled upon a pallet having predetermined surface dimensions.

Another object of this invention is to provide containers capable of being assembled so that in assembling the containers no over-hanging or extending members or elements are presented which may hang, hook or otherwise engage objects not associated with the container structure which might cause an upsetting force to be applied to the entire assemblage of containers.

A further object of the invention is to provide containers having mutually engageable structural members capable of being interconnected one with the other upon the assemblage or storage of a multiplicity of containers in one specific location thereby establishing by such interconnecting members a sturdy, firm, rigid, stable structure composed of a multiplicity of container members interconnected and juxtaposed one with the other and being further composed of a multiplicity of layers of individual containers firmly interlocked by means of complementary structural elements provided on each one of the containers.

Another object of this invention is to provide containers having interlocking structural members which are so constructed that the orientation of the containers for interlocking connection one with the other is flexible and versatile and precludes the requirement that each container be oriented in a definitely defined predetermined manner. Thus, the containers of this invention may be stacked one upon the other and arranged in a side-by-side juxtaposed position without concern as to the particular orientation of any one specific end member or side member of each individual container.

An additional object of this invention is to provide containers having structure which will facilitate a nesting of the containers one inside the other when the containers are empty.

A still further object of this invention is to provide containers which may be filled with products or produce and stacked, arranged and assembled to form a multiplicity of containers one on the top of the other so that the products or produce in the containers will not be mashed, bruised, cut or otherwise damaged, mutilated or destroyed by another container.

The features of the inventive concepts which are believed to be new are set forth in the claims. However, the entire inventive concepts, together with further objects and advantages thereof may best be understood by reference to the following specification, when considered in conjunction with the accompanying drawings, in which:

FIGURE 2 is a perspective view from the under side of a container showing recessed cut-out portions which provide interlocking structure for the ends of each container;

FIGURE 3 is a perspective view from the under side of a container showing recessed portions which provide interlocking structure for the sides of each container;

FIGURE 4 is a sectional view of two containers stacked one on top of the other taken on line 4—4 of FIGURE 1;

FIGURE 5 is a sectional view of two containers stacked one on top of the other, taken on line 5—5 of FIGURE 1; and FIGURE 6 is a perspective view of a multiplicity of the containers stacked or nested one within the other so as to present the smallest possible exterior surface for a multiplicity of stacked containers.

Figure 1:
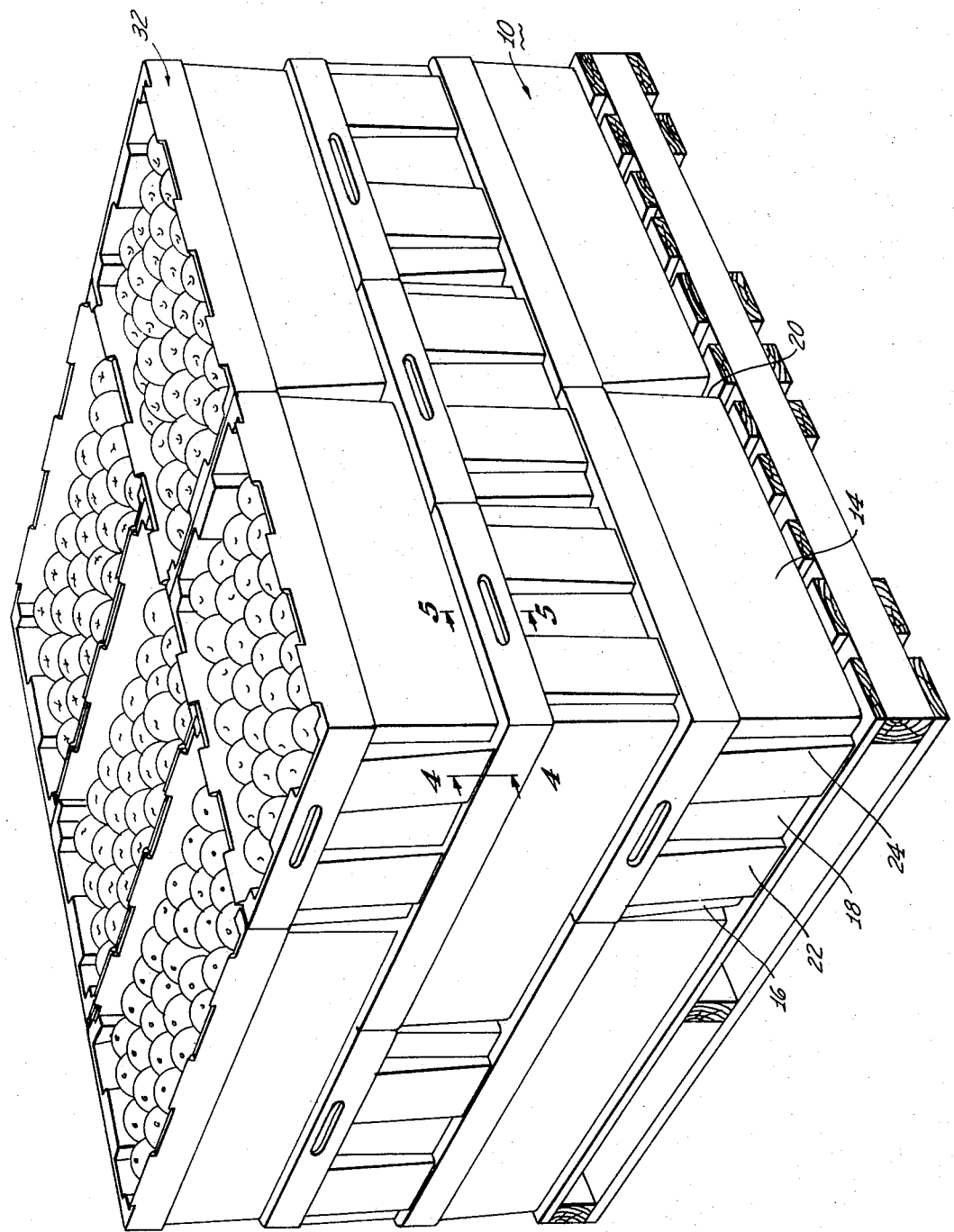
FIGURE 1 is a perspective view of an assemblage of containers filled with produce and stacked so as to be positioned in the maximum advantageous orientation and interlocking positions upon a portable pallet.

The container of the illustrated embodiment shown in the drawings is designated generally as 10 in FIGURE 1. The container 10 includes a bottom 12 and a pair of outwardly flared side walls 14 and 16 which are formed integral with the bottom and which extend upwardly from the bottom. The container 10 also includes a pair of outwardly flared end walls 18 and 20. The end walls are formed integral with the bottom 12 and with the side walls 14 and 16 and they also extend upwardly from the bottom.

A pair of upwardly extended fluted sections 22 and 24 on end wall 18 extend from the bottom 12. Similarly, a pair of upwardly extended fluted sections extend from the bottom 12 on end wall 20. The fluted sections on the end walls are formed so as to provide wedged-shaped spaces 30, 30', 30'' and 30''' on the interior surfaces of each end wall 18 and 20, respectively. The exterior surface of the fluted members extend from the side walls by graduated amounts with the smallest extension of the flutes being adjacent the bottom of the container 10 and then gradually increasing in their extension from the side walls toward the top of the container.

The container 10 is provided with a peripheral rim 32 surrounding its uppermost outer exterior area. The rim 32 extends outwardly from the side and end walls of the container by an amount equal to the extension of the uppermost portion of the fluted members provided on the end walls 18 and 20. The uppermost peripheral surface of the rimmed portion of the container is formed so that lug projections 34 extend upwardly at predetermined intervals from the outer rim surface. The lug projections 34 on the upper peripheral surface of the rim are constructed so as to fit snugly within the recessed portions 36 provided within the upwardly extended fluted sections found on each end wall 18 and 20 of the containers 10. The spacing between the lug projections 34 is such that when two containers are placed in an end-to-end relationship, the upper side peripheral surfaces of the two containers present six lug projecting members equally spaced one from the other. This spacing and structural configuration of the lug projections on the upper peripheral surfaces facilitates the placing of three containers in a side-by-side juxtaposed orientation so that the recessed under portions 36 of the end fluted members securely lock over the lug projecting members in a neat, compact, snugly fitting manner. Thus it can be seen that in the side-by-side juxtaposed position there is a uniformity of spatial displacement between the fluted side members not only on each container, but also of the fluted side members of adjacently disposed containers. For example, referring to FIGURE 1, it is seen that the fluted side members 22 and 24 of the side-by-side adjacently disposed containers 10 are equidistant from each other. Similarly, the same spatial displacement exists for the projecting lug members 34 on the upper surface of the two containers which are spaced in an end-to-end disposition.

When the recessed portions 36 of the end fluted members are snugly placed over the lug projecting members on the upper peripheral surface of the rim 32 of the containers 10 the outer upper surface 38 of rim 32 contacts the lower peripheral surface 40 of the end fluted members. Also, the bottom surface 42 of the containers are provided with recess portions 44 for snugly fitting over the lug projecting members 34 in the same manner as the recessed portions 36 of the end fluted members fit over the lug projecting members. When the recessed portions 36 and 44 are snugly fitted over the lug projecting members 34 the bottom surface of the container 10 is firmly seated upon the supporting surfaces 46 and 48 provided on the end walls 18 and 20 respectively and upon the supporting surfaces 50, 52, 54 and 56 provided in the corner areas of the container 10. Thus it can be seen that when the containers are stacked one upon the other as shown in FIGURE 1 of the drawings and are interlocked by the snug fit of the lug projecting members within the recessed portions 36 and 44 provided in the containers, the assemblage of containers is held firmly in position in a manner which prevents the slippage of one container into another thus preventing possible damage to produce in lower tier containers.

In stacking the containers with produce as shown in FIGURE 1, the weight of the produce further assures positive contact and firm attachment of the interlocking lug projecting members 34 with the recessed portions 36 and 44 provided in the containers 10.

The downwardly projecting outer portion of the upper rim 32 on each container 10 is provided with openings 58 and 60. These openings provide gripping structure whereby the containers may be moved, and manipulated by hand, instrument or other machinery which may be attached to the container by means of the openings provided within each container.

When the containers are empty, it is desirable that they be stacked or nested with as little outer area of the containers exposed as possible, and so that the stacked containers will occupy as little space as possible. The configuration and structural features of these containers provide for such a stacking or nesting arrangement. The wedged-shaped fluted portions on the side walls 18 and 20 of the containers are constructed to have dimensional tolerances so that the outer portions thereof fit snugly within the inner recessed areas 30, 30', 30'' and 30''' within the end walls. By being provided with a sloping contour, the outer sections of the fluted members contact and snugly fit within the inner recessed portions of the containers. The amount of retentive force with which the containers are held together is increased as the containers are moved closer to a bottom-to-bottom contact since the contacting surface area of the two containers is increased and the wedging configuration of the fluted members makes for a closer firmer fit as well as facilitating the ease with which one container slidingly fits within the other.

When the containers are stacked or nested one within the other, the bottom and sides of the two adjacent containers are in contact. The downwardly projecting outer portion of the upper rim 32 on each container 10 is properly dimensioned so that it contacts the upper surface of the rim 32 of the container immediately below it in the stack. As can be seen in FIGURE 5 of the drawings rim 32 is provided with recess portions 62 which permit lugs 34 to fit snugly within the rim 32 when the containers are placed in a stacked or nested assemblage. When the downwardly projecting portion of the rim 32 contacts the upper surface of the container it rests firmly there interlocked with the other containers in the stack. Thus it can be seen that either in a stacked arrangement for a pallet assemblage as shown in FIGURE 1 or in a nested arrangement as shown in FIGURE 6, the configuration and structural features of this container provide for a snugly fitting, firmly held arrangement of containers whereby optimum utilization is made of a minimum amount of space for the storage and transportation of empty containers and for the storage, transportation or display of products or produce carried within the containers.

Other advantages and features of the present invention will be apparent to those familiar with stacking and nesting containers and while it will be apparent that the embodiment of the present invention herein disclosed is well calculated to fulfill the objects of the invention, it will be appreciated that the invention is susceptible to modification, variation and change without departing from the proper scope of the meaning of the sub-joined claims.

What is claimed is:

1. A rectangular stackable-nestable container adapted to be nested with other like containers, and adapted to be stacked in a multiple-level tier, with each layer in the tier containing a plurality of the containers in a juxtaposed relationship, and with the containers in the tier mutually inter-locked, one with the other, said container comprising: a bottom; a pair of side walls extending upwardly from said bottom; a pair of end walls extending upwardly from said bottom; an outwardly extending rim formed in said walls and extending around the periphery of the container adjacent the upper edge thereof; a plurality of fluted sections formed in each of the walls of one of said pairs and extending upwardly to said rim; and a plurality of lug projection members formed in said rim and extending upwardly from the upper edge of the container at spaced intervals along each of the walls of the other of said pairs; said fluted members defining recessed under portions at the lower ends thereof in position to lock over certain of the aforesaid lug projection members of lower like containers, and said bottom being provided with recessed under portions at spaced intervals along each of the walls of the other of said pairs to lock over others of the aforesaid lug projection members of the lower like containers.

2. The stackable-nestable container defined in claim 1 in which said side walls and said end walls are outwardly flared with respect to said bottom.

3. The stackable-nestable container defined in claim 1 in which said bottom, said side walls, said end walls, said fluted sections, said outwardly extending rim and said lug projection members are all integral with one another.

4. The stackable-nestable container defined in claim 1 in which said fluted sections are formed on said end walls and said lug projection members extend upwardly from said side walls.

5. The stackable-nestable container defined in claim 1 in which said rim is provided with recessed under portions in axial alignment with respective ones of said lug projection members to lock over the lug projection members of a lower like container when the containers are nested down within one another.

References Cited

UNITED STATES PATENTS

| | | | |
|---|---|---|---|
| D. 201,843 | 8/1965 | Johnson. | |
| 2,064,518 | 12/1936 | Brogden | 220—97 |
| 3,283,943 | 11/1966 | Cargelutti | 220—97 |

FOREIGN PATENTS 1,177,039   4/1959   France.

THERON E. CONDON, *Primary Examiner.*

GEORGE E. LOWRANCE, *Examiner.*